(12) United States Patent
Kim et al.

(10) Patent No.: US 8,813,897 B2
(45) Date of Patent: Aug. 26, 2014

(54) IMPACT ABSORBING APPARATUS OF VEHICLE

(71) Applicant: Hyundai Motor Company, Seoul (KR)

(72) Inventors: Nam Cheol Kim, Suwon-si (KR); Hun Soo Kim, Bucheon-si (KR); Jin Wook Lee, Busan (KR); Hae Ryong Kim, Incheon (KR); Hee Chan Yang, Gunpo-si (KR); Tae Soo Jung, Siheung-si (KR); Jeong Ho Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/955,871

(22) Filed: Jul. 31, 2013

(65) Prior Publication Data

US 2014/0174842 A1 Jun. 26, 2014

(30) Foreign Application Priority Data

Dec. 26, 2012 (KR) ........................ 10-2012-0153733

(51) Int. Cl.
*B60K 28/10* (2006.01)

(52) U.S. Cl.
USPC .......................................... 180/274

(58) Field of Classification Search
USPC ................................................ 180/274, 271
See application file for complete search history.

(56) References Cited

U.S. PATENT DOCUMENTS

| | | | | |
|---|---|---|---|---|
| 3,695,629 | A * | 10/1972 | Schlanger | 280/730.1 |
| 3,893,726 | A * | 7/1975 | Strohschein | 293/1 |
| 6,820,369 | B2 * | 11/2004 | Fenelon | 49/349 |
| 6,942,261 | B2 * | 9/2005 | Larsen et al. | 293/107 |
| 7,984,939 | B2 * | 7/2011 | Vodavoz | 293/107 |
| 2004/0111970 | A1 * | 6/2004 | Fenelon | 49/349 |
| 2010/0025142 | A1 * | 2/2010 | Staib | 180/271 |

FOREIGN PATENT DOCUMENTS

KR    10-1998-060942    10/1998

* cited by examiner

*Primary Examiner* — Faye M. Fleming
(74) *Attorney, Agent, or Firm* — McDermott Will & Emery LLP

(57) ABSTRACT

An impact absorbing apparatus of a vehicle includes a back beam to secure an impact absorbing space while retreating rearward at the time of a collision accident with a pedestrian. This makes it possible to prevent direct contact between the back beam, which is a rigid body, and the pedestrian. Therefore, injury to the pedestrian may be significantly decreased.

8 Claims, 9 Drawing Sheets

IMPACT ABSORBING APPARATUS OF VEHICLE

CROSS REFERENCE TO RELATED APPLICATION

This application claims the benefit of priority to Korean Patent Application No. 10-2012-0153733, filed on Dec. 26, 2012, which is hereby incorporated by reference in its entirety into this application.

TECHNICAL FIELD

The present disclosure relates to an impact absorbing apparatus of a vehicle capable of minimizing an injury to a pedestrian by inducing rearward movement of a back beam at the time of collision with the pedestrian.

BACKGROUND

A technology of operating a safety apparatus before colliding with an obstacle in a case where a distance from the obstacle is very narrow while driving a vehicle, such that the collision is not avoidable, thereby minimizing damage to the vehicle and protecting a passenger as safe as possible after the collision has been developed. An example of the safety apparatus includes an active bumper apparatus, a bumper air bag apparatus, or the like.

An example of an impact absorbing apparatus according to the related art is shown in FIG. 1. The impact absorbing apparatus shown in FIG. 1 is configured to include a motor 3 installed to be fixed to a bumper 1 through a bumper bracket 2, a lead screw 4 receiving power from the motor 3 to thereby be shaft-rotated and having one end coupled to the bumper bracket 2, a fixing nut 6 screwed to the lead screw 4 and installed to be fixed to a vehicle body frame 5 spaced apart from the bumper bracket 2, and a length variable energy absorbing shaft 7 disposed in parallel with the lead screw 4 and having one end fixed to the bumper bracket 2 and the other end installed to be fixed to the fixing nut 6.

In the impact absorbing apparatus according to the related art, when the motor 3 is driven, the power of the motor 3 is transferred to the lead screw 4 through a gear 8, such that the lead screw 4 is rotated. In this case, the fixing nut 6 is fixed to the vehicle body frame 5, such that the lead screw 4 is moved forward of the vehicle simultaneously being rotated. Therefore, the bumper 1 is moved and protruded forward of the vehicle, and the energy absorbing shaft 7 performs an operation of increasing its length.

Therefore, an obstacle positioned in front of the vehicle does not directly collide with a vehicle body, but collides with the bumper 1 protruded forward, such that damage to the vehicle may be decreased and a passenger may be safely protected after collision.

However, since the impact absorbing apparatus according to the related art as described above has a structure installed within a lower space of a back beam of a bumper, the lower space of the back beam may not be utilized. In addition, since the impact absorbing apparatus according to the related art as described above uses the motor 3 as a power source and uses the lead screw 4 in order to transfer the power, the structure thereof is complicated and weight thereof is heavy. Particularly, a system configuration thereof is complicated, such that excessive cost is required at the time of repair, and responsiveness is low until the bumper 1 is protruded due to the structure in which the bumper 1 is protruded by the rotation of the lead screw 4.

Further, since the impact absorbing apparatus according to the related art as described above has the structure in which the bumper 1 absorbs impact while being protruded, a secondary impact may be applied to the pedestrian by protrusion force of the bumper 1 at the time of collision with the pedestrian. Therefore, there is a risk that injury to the pedestrian will increase.

The matters described as the related art have been provided only for assisting in the understanding for the background of the present disclosure and should not be considered as corresponding to the related art known to those skilled in the art.

KR 10-1998-0060942 A has proposed such a bumper impact absorption device of a vehicle.

SUMMARY

An object of the present disclosure is to provide an impact absorbing apparatus of a vehicle capable of utilizing a lower space of a back beam of a bumper for another purpose and promoting a decrease in weight by configuring a system at a height of the back beam, particularly, capable of minimizing an injury to a pedestrian by inducing rearward movement of the back beam at the time of collision with the pedestrian.

According to an exemplary embodiment of the present disclosure, an impact absorbing apparatus of a vehicle includes: a moving bracket installed to be movable in a length direction of a side member in an internal space of the side member and installed so that one end thereof protruded forward of the side member is connected to a back beam; a rotating gear integrally coupled with one end of a gear shaft so that shaft-rotation is possible while penetrating through the side member; a gear locker installed in the side member and controlled by a controller; a bracket locker installed at the other ends of the moving bracket and the gear shaft so as to connect the moving bracket and the gear shaft to each other; and a bracket operator installed to be fixed to the side member and be connected to the moving bracket.

The impact absorbing apparatus of a vehicle may further include a gear spring installed with one end thereof coupled to the side member and the other end thereof coupled to the gear shaft where the gear spring is wound around the gear shaft to provide rotational force to the gear shaft so that the gear shaft is shaft-rotated at the time of unlocking the rotating gear.

The moving bracket may be provided with a guide hole having both ends thereof extended along a front and rear direction of the moving bracket, and one end of the gear shaft may be installed to be inserted into the guide hole.

The gear locker may include: a housing installed in the side member; a locking lever installed in the housing so as to be rotatable through a hinge shaft and having an engagement protrusion formed integrally with one end thereof, the engagement protrusion being engaged with the rotating gear; a lever spring installed so that one end thereof is supported by the other end of the locking lever and the other end thereof is supported by the housing to provide elastic force to the locking lever so that the engagement protrusion is engaged with the rotating gear; and an actuator installed to be fixed to the housing so as to face the lever spring, having the locking lever therebetween, and including a plunger pushing and rotating the locking lever so that the engagement protrusion is disengaged from the rotating gear according to a control of the controller.

The bracket locker may include: a line shaped locking block integrally coupled with the other end of the gear shaft; and an upper guide protrusion and a lower guide protrusion positioned at upper and lower sides, respectively, having the guide hole therebetween, protruded from one side surface of the moving bracket toward the rotating gear, formed to contact the locking block when the locking block is in a standing state, thereby limiting movement of the moving bracket, and formed to avoid a contact with the locking block when the locking block is in a horizontally laid state, thereby allowing the movement of the moving bracket.

The bracket operator may include: a fixed bracket installed to be fixed to an inner portion of the side member at a position spaced apart from the moving bracket toward a rear side thereof; and a bracket spring having both ends thereof installed to be fixed to the moving bracket and the fixed bracket and providing elastic force to the moving bracket so that the moving bracket is moved toward the fixed bracket.

The bracket operator may include: a cylinder member having one end fixed to a front end portion of the side member and the other end installed toward the rear of the side member and having gunpowder filled in an internal space thereof, the gunpowder generating a pressure at the time of being exploded; and a piston rod member having one end thereof inserted into the cylinder member so as to be movable along the cylinder member and the other end thereof protruded from the cylinder member and coupled to the moving bracket so as to forcibly move the moving bracket rearward while being protruded from the cylinder member by the pressure generated at the time of a gunpowder explosion.

A plurality of rotating gears, a plurality of gear shafts, and a plurality of locking blocks may be disposed in a row along the front and rear direction of the moving bracket, the rotating gears may be engaged with each other, and only any one of the rotating gears may be engaged with the engagement protrusion of the locking lever.

DETAILED DESCRIPTION

Figure 1:
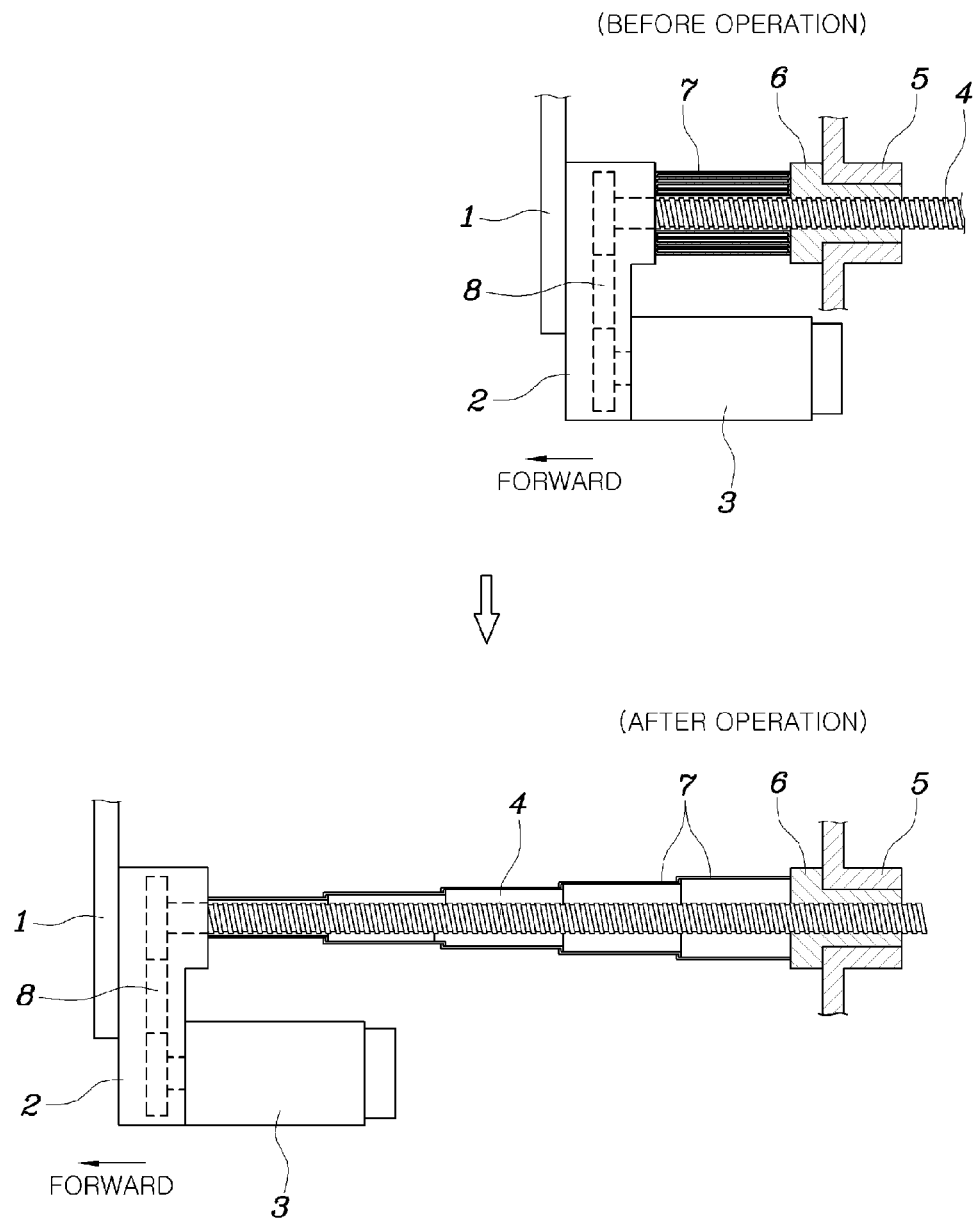
FIG. 1 is a view for describing an impact absorbing apparatus of a vehicle according to the related art.
Figure 2:
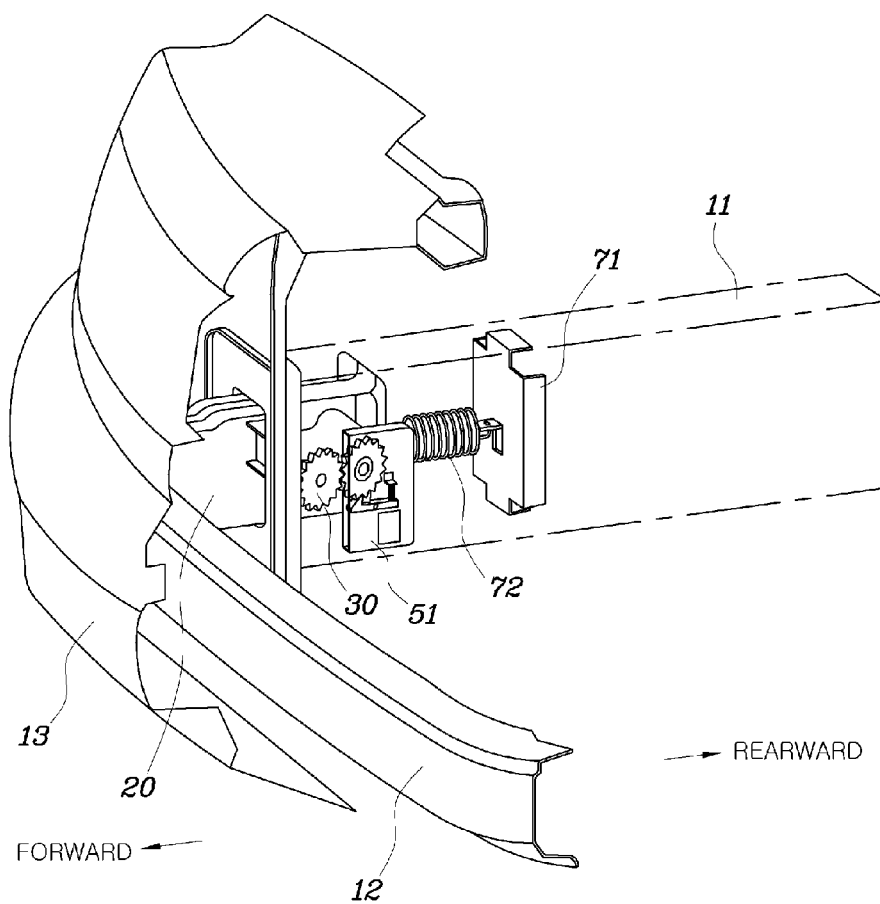
FIGS. 2 through 4 are views showing an impact absorbing apparatus according to an exemplary embodiment of the present disclosure.
Figure 3:
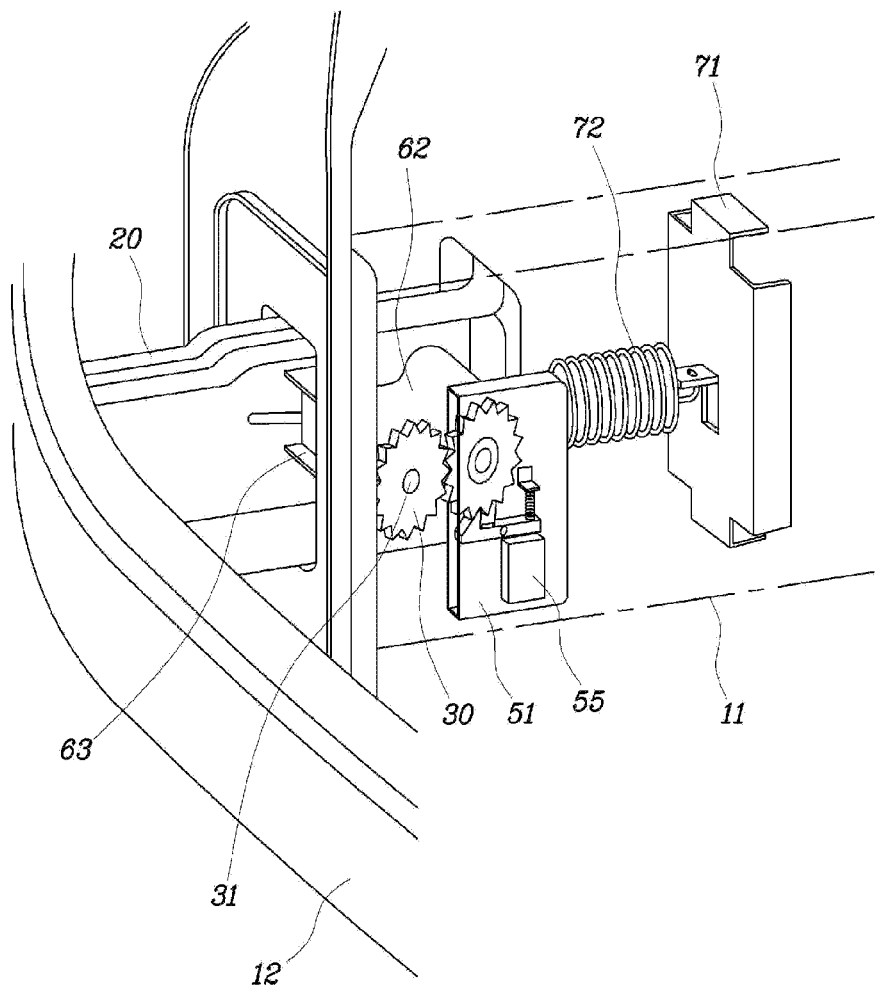

Hereinafter, an impact absorbing apparatus of a vehicle according to exemplary embodiments of the present disclosure will be described with reference to the accompanying drawings.

The impact absorbing apparatus according to the present disclosure is mainly configured of two exemplary embodiments according to a bracket operator. The impact absorbing apparatus according to an exemplary embodiment of the present disclosure will be described with reference to FIGS. 2 through 5.

The impact absorbing apparatus of a vehicle according to the exemplary embodiment of the present disclosure capable of protecting a pedestrian includes a moving bracket 20 installed to be movable in a length direction of a side member 11 in an internal space of the side member 11 and installed so that one end thereof protruded forward of the side member 11 is connected to a back beam 12; a rotating gear 30 coupled integrally with one end of a gear shaft 31 so that shaft-rotation is possible while penetrating through the side member 11; a gear locker 50 installed in the side member 11, controlled by a controller 40, and selectively locking a rotation operation of the rotating gear 30; a bracket locker 60 installed at the other ends of the moving bracket 20 and the gear shaft 31 so as to connect the moving bracket 20 and the gear shaft 31 to each other and operated to lock the moving bracket 20 at the time of locking the rotating gear 30 and unlock the moving bracket 20 at the time of unlocking the rotating gear 30; and a bracket operator 70 installed to be fixed to the side member 11 and be connected to the moving bracket 20 and operated to forcibly move the moving bracket 20 inwardly of the side member 11 at the time of unlocking the rotating gear 30.

A bumper 13 is positioned in front of the back beam 12.

In addition, the impact absorbing apparatus of a vehicle according to the exemplary embodiment of the present disclosure further includes a gear spring 32 installed so that one end thereof is coupled to the side member 11 and the other end thereof is coupled to the gear shaft 31 in a state in which the gear spring 32 is wound around the gear shaft 31 to provide rotational force to the gear shaft 31 so that the gear shaft 31 may be shaft-rotated at the time of unlocking the rotating gear 20.

The gear spring 32 is preferably a torsion spring, but is not limited thereto.

In addition, the moving bracket 20 is provided with a guide hole 21 having both ends thereof extended along a front and rear direction of the moving bracket, and the other end of the gear shaft 31 is installed to be inserted into the guide hole 21.

Therefore, the moving bracket 20 may be slid in the front and rear direction of the moving bracket and be guided by the guide hole 21 and the gear shaft 31.

In addition, the gear locker 50 includes a housing 51 installed in the side member 11; a locking lever 53 installed in the housing 51 so as to be rotatable through a hinge shaft 52 and having an engagement protrusion 53a formed integrally with one end thereof, the engagement protrusion 53a being engaged with the rotating gear 30; a lever spring 54 installed so that one end thereof is supported by the other end of the locking lever 53 and the other end thereof is supported by the housing 51 to provide elastic force to the locking lever 53 so that the engagement protrusion 53a is engaged with the rotating gear 30; and an actuator 55 installed to be fixed to the housing 51 so as to face the lever spring 54, having the locking lever 53 therebetween, and including a plunger 55a pushing and rotating the locking lever 53 so that the engagement protrusion 53a may be disengaged from the rotating gear 30 according to a control of the controller 40.

Here, the lever spring 54 is preferably a compression spring, but is not limited thereto.

Further, the bracket locker 60 includes a line shaped locking block 61 coupled integrally with the other end of the gear shaft 31; and an upper guide protrusion 62 and a lower guide protrusion 63 disposed at upper and lower side of the bracket locker 60, respectively, having the guide hole 21 therebetween, protruded from one side surface of the moving bracket 20 toward the rotating gear 30, formed to contact the locking block 61 when the locking block 61 is in a standing state, thereby limiting the movement of the moving bracket 20, and formed to avoid a contact with the locking block 61 when the locking block 61 is in a horizontally laid state, thereby allowing the movement of the moving bracket 20.

Figure 5A:
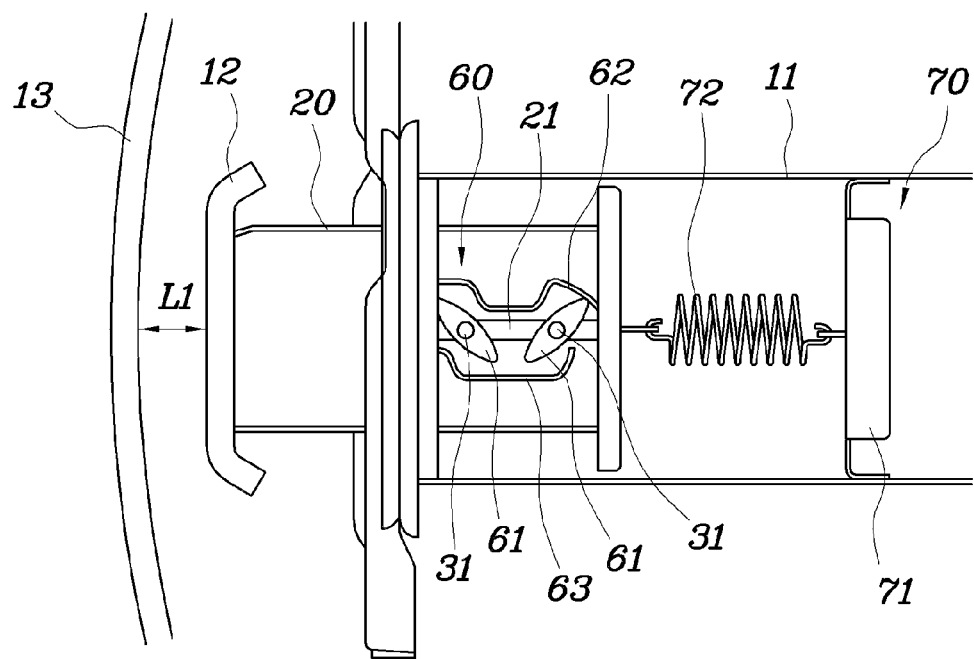
FIGS. 5A and 5B are views for describing an operation process of the impact absorbing apparatus according to the exemplary embodiment of the present disclosure.

The upper guide protrusion 62 and the lower guide protrusion 63 are provided with grooves and protrusions, respectively, such that when the locking block 61 is in the standing state as shown in FIG. 5A, both ends of the locking block 61 are inserted into the grooves of the upper and lower guide protrusions 62 and 63. Therefore, when the moving bracket 20 is to be moved, both ends of the locking block 61 contact the protrusions of the upper and lower guide protrusions 62 and 63, such that the moving bracket 20 may not be moved.

Figure 5B:
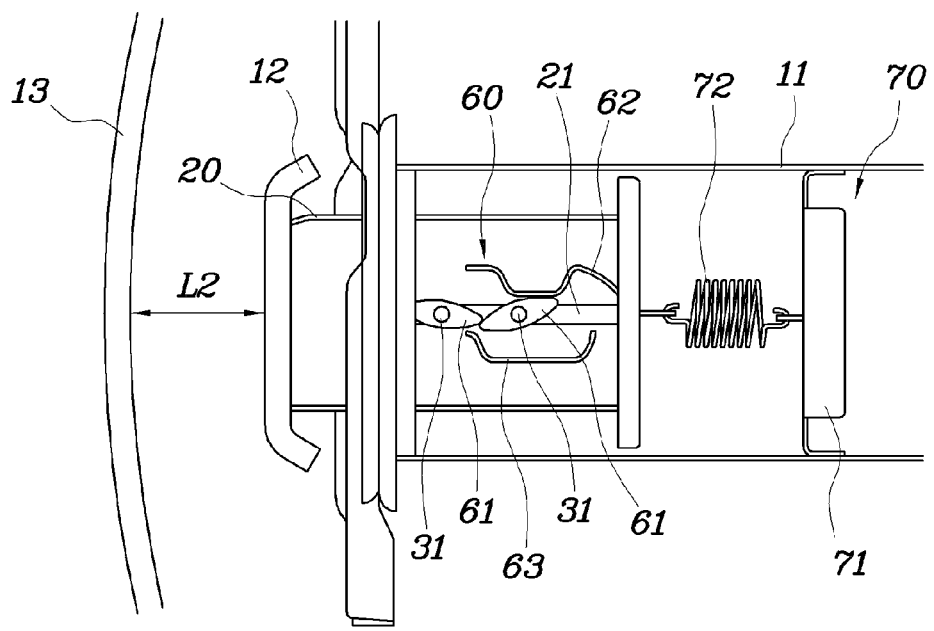

In addition, when the locking block 61 is in the horizontally laid state as shown in FIG. 5B, both ends of the locking block 61 are maintained in a state in which a contact with the protrusions of the upper and lower guide protrusions 62 and 63 is avoided. Therefore, the moving bracket 20 may be smoothly moved in front and rear direction.

Meanwhile, the bracket operator 70 according to the exemplary embodiment of the present disclosure includes a fixed bracket 71 fixed to an inner portion of the side member at a position spaced apart from the moving bracket 20 toward a rear thereof; and a bracket spring 72 having both ends thereof fixed to the moving bracket 20 and the fixed bracket 71 and providing the elastic force to the moving bracket 20 so that the moving bracket 20 may be moved toward the fixed bracket 71.

Here, the bracket spring 72 is preferably a tension spring, but is not limited thereto.

In the impact absorbing apparatus of a vehicle according to the exemplary embodiment of the present disclosure, a plurality of rotating gears 30, a plurality of gear shafts 31, and a plurality of locking blocks 61 are configured to be disposed in a row along the front and rear direction of the moving bracket, the rotating gears 30 are installed to be engaged with each other, and only any one of the rotating gears 30 is installed to be engaged with the engagement protrusion 53a of the locking lever 53.

The rotating gear 30 engaged with the engagement protrusion 53a of the locking lever 53 becomes a driving gear, and the other rotating gear becomes a driven gear.

Figure 6:
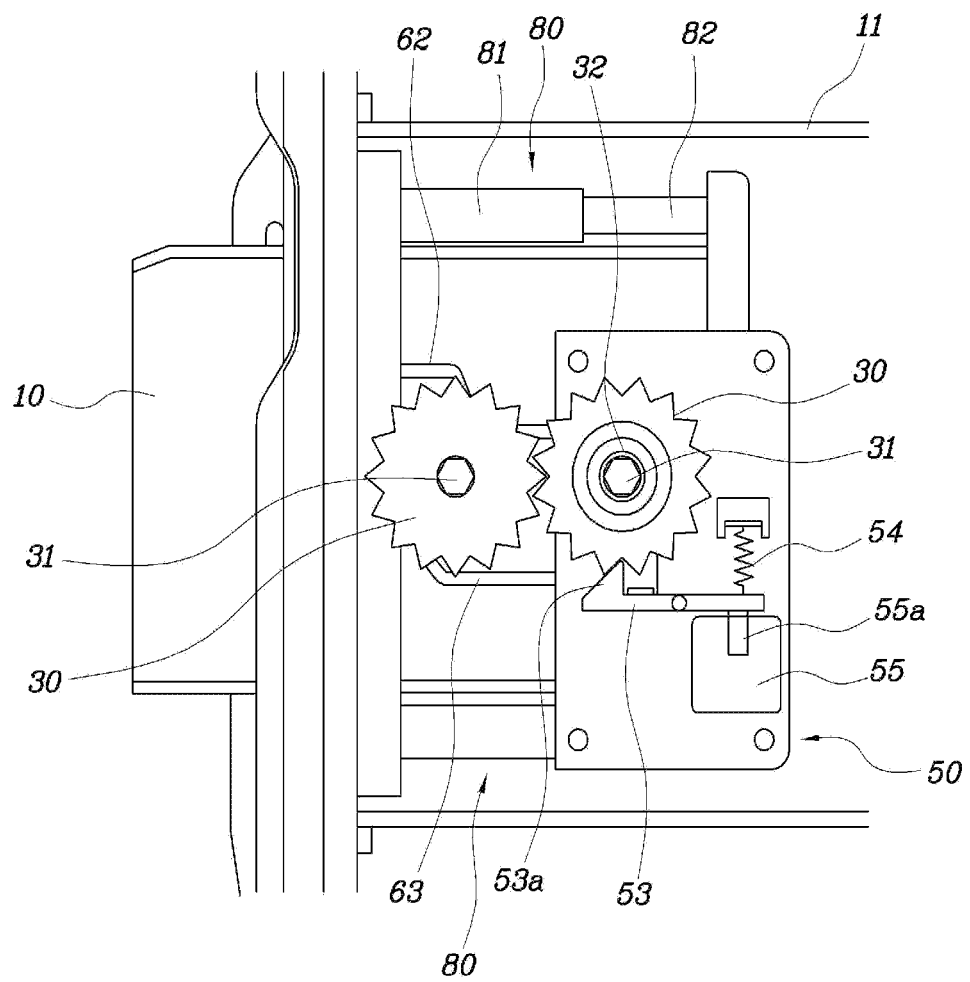
FIG. 6 is a view showing an impact absorbing apparatus according to another exemplary embodiment of the present disclosure.
Figure 7A:
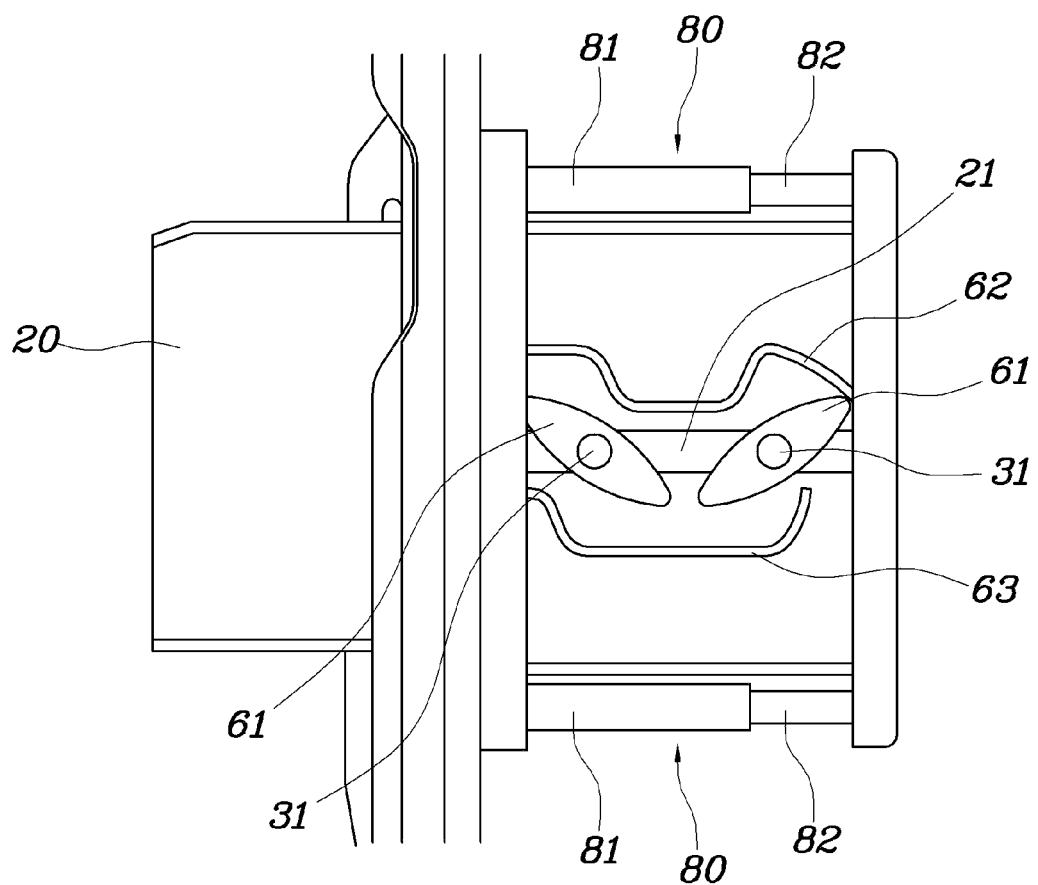
FIGS. 7A and 7B are views for describing an operation process of the impact absorbing apparatus according to another exemplary embodiment of the present disclosure.
Figure 7B:
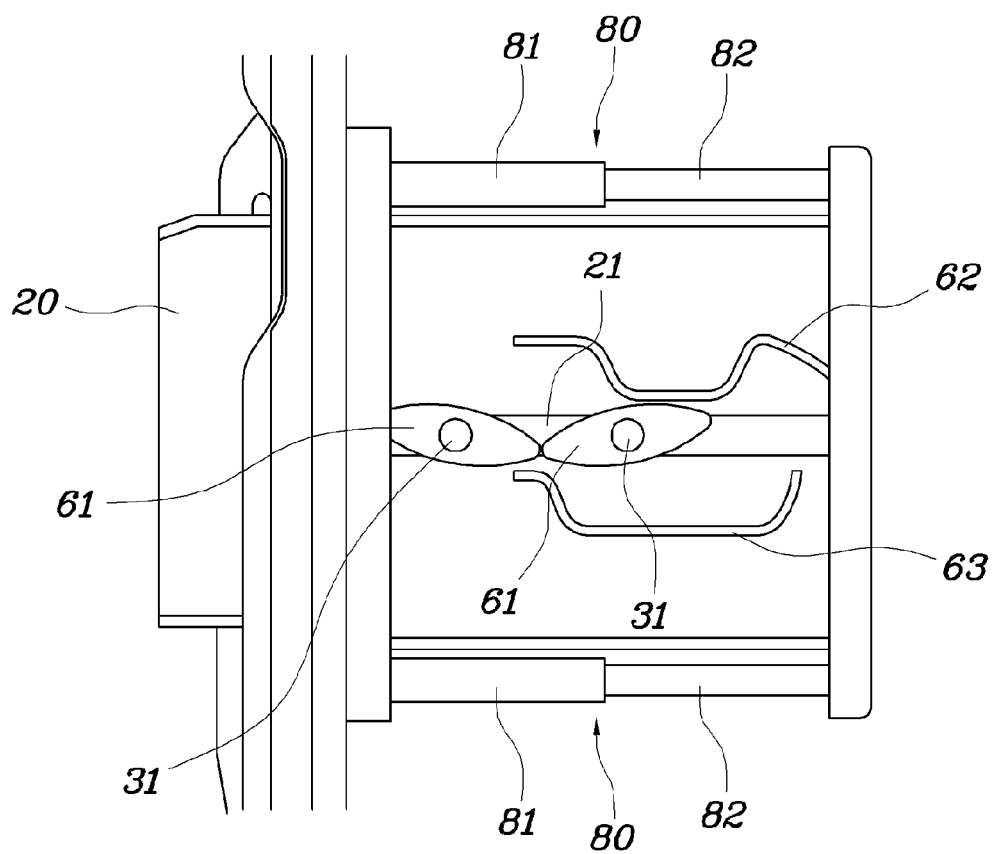

Furthermore, a bracket operator 80 according to another exemplary embodiment of the present disclosure includes a cylinder member 81 having one end fixed to a front end portion of the side member 11 and the other end installed toward the rear of the side member and having gunpowder filled in an internal space thereof, gunpowder generating pressure at the time of being exploded; and a piston rod member 82 having one end thereof inserted into the cylinder member 81 so as to be movable along the cylinder member 81 and the other end thereof protruded from the cylinder member 81 and coupled to the moving bracket 20 so as to forcibly move the moving bracket 20 rearward while being protruded from the cylinder member 81 by the pressure generated at the time of exploding the gunpowder, as shown in FIGS. 6 and 7.

Hereinafter, an operation of the impact absorbing apparatus of a vehicle according to the exemplary embodiment of the present disclosure will be described.

Figure 4:
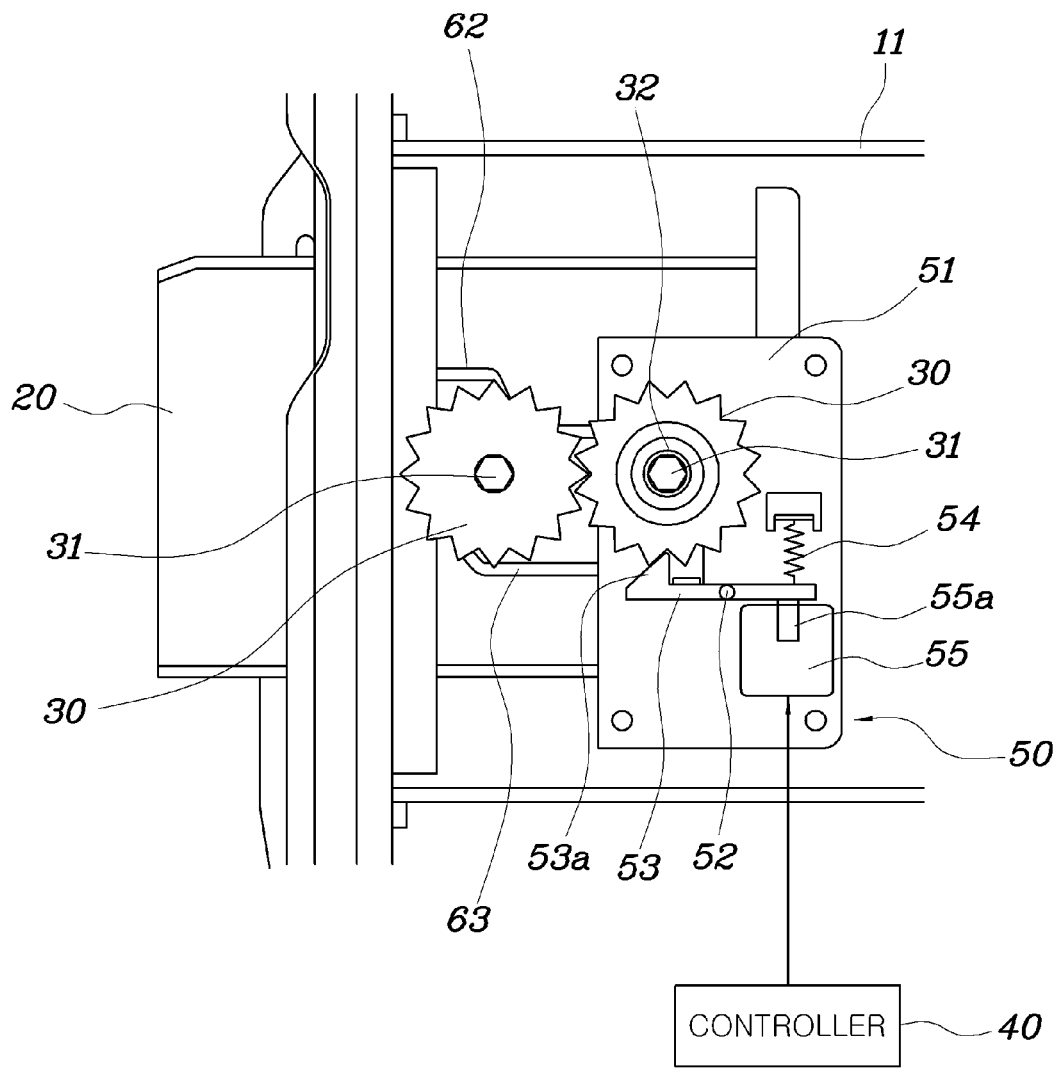

FIGS. 4, 5A and 5B show a normal state in which a collision accident with a pedestrian does not occur.

In the normal state, the rotating gear 30 is engaged with the engagement protrusion 53a of the locking lever 53, such that the rotating gear 30 may not be rotated. Therefore, the locking block 61 contacts the upper and lower guide protrusions 62 and 63 to lock the moving bracket 20.

Therefore, even though the elastic force of the bracket spring 72 is transferred to the moving bracket 20, the moving bracket 20 is maintained in a locking state in which the moving bracket 20 may not be moved rearward toward the fixed bracket 71 by the locking of the gear locker 50 and the bracket locker 60.

Referring to FIG. 5A, in the normal state as described above, an interval L1 between the bumper 13 and the back beam 12 is in a narrow state.

In addition, when a collision accident with a pedestrian occurs, the controller 40 recognizing this situation transmits a control signal to operate the actuator 55, and the plunger 55a is protruded upwardly from a state shown in FIG. 4 to push the locking lever 53.

In this case, the locking lever 53 is rotated around the hinge shaft 52 in a counterclockwise direction from the state in FIG. 4. Therefore, the engagement protrusion 53a of the locking lever 53 is disengaged from the rotating gear 30. At this moment, the gear shafts 31 and the rotating gears 30 are rotated in a clockwise direction by the elastic force of the gear spring 32 (in the state shown in FIG. 4, a right rotating gear is rotated in the clockwise direction and a left rotating gear is rotated in the counterclockwise direction).

In addition, when the gear shaft 31 is rotated, the locking block 61 is also rotated together with the gear shaft 31. Therefore, the locking block 61 becomes the horizontally laid state. At this moment, both ends of the locking block 61 become a state in which contact with the upper and lower guide protrusions 62 and 63 is avoided.

When both of the gear locker 50 and the bracket locker 60 are unlocked, the moving bracket 20 is slid rearward toward the fixed bracket 71 by the elastic force of the bracket spring 72, such that the moving bracket 20 assumes a state as shown in FIG. 5B.

When the moving bracket 20 is moved rearward at the time of the collision accident with the pedestrian, the back beam 12 is also moved rearward together with the moving bracket 20. Therefore, an interval L2 between the bumper 13 and the back beam 12 assumes a state in which it becomes significantly wider as compared to the normal state of FIG. 5A.

Therefore, since the back beam 12 is moved rearward before a leg or a knee of the pedestrian colliding with the bumper 13 contacts the back beam 12 corresponding to a rigid body, injury to the pedestrian may be significantly decreased.

In addition, since a rear space between the bumper 13 and the back beam 12 becomes significantly wide at the time of the collision accident, a sufficient impact absorbing space may be secured. Therefore, at the time of collision with the pedestrian, the impact may be sufficiently absorbed.

Meanwhile, FIGS. 6 and 7 show that the bracket operator 80 includes the piston rod member 82 operated by the pressure generated at the time of the gunpowder explosion. Here, when the gunpowder in the cylinder member 81 is exploded by the control signal of the controller 40, the piston rod member 82 moves the moving bracket 20 rearward while being protruded. Since other components are the same as those of the exemplary embodiment of the present disclosure described above, a description thereof will be omitted.

As described above, in the exemplary embodiment of the present disclosure, since a component for absorbing the impact is positioned at a height of the back beam 12, a lower space of the back beam 12 may be utilized for another purpose.

In addition, components having lighter weight than a motor and a lead screw according to the related art are used, thereby making it possible to contribute to weight decrease and fuel efficiency improvement.

In addition, since the moving bracket 20 connected to the back beam 12 is moved by spring force or pressure by the gunpowder explosion, more rapid responsiveness may be secured as compared to the related art in which the motor is used as a power source and the screw is used as a power transferring element. Therefore, the pedestrian may be more safely protected.

In addition, since the impact absorbing apparatus of a vehicle according to the exemplary embodiment of the present disclosure has a configuration in which the back beam 12 corresponding to the rigid body secures an impact absorbing space while retreating rearward rather than a configuration in which the back beam 12 contacts the pedestrian while being protruded forward at the time of the collision accident with the pedestrian, contact between the pedestrian and the back beam 12 may be prevented. Therefore, the injury to the pedestrian may be significantly decreased.

With the impact absorbing apparatus of a vehicle according to the exemplary embodiment of the present disclosure, since the component for absorbing the impact is positioned at the height of the back beam, the lower space of the back beam may be utilized for another purpose. In addition, since rapid responsiveness may be secured in an operation for absorbing the impact, the pedestrian may be more safely protected. Particularly, the back beam secures the impact absorbing space while retreating rearward, thereby making it possible to prevent a direct contact between the back beam, which is a rigid body, and the pedestrian. Therefore, injury to the pedestrian may be significantly decreased.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An impact absorbing apparatus of a vehicle, comprising:
   a moving bracket installed to be movable in a length direction of a side member in an internal space of the side member and installed so that one end thereof protruded forward of the side member is connected to a back beam;
   a rotating gear integrally coupled with one end of a gear shaft installed so that shaft-rotation is possible while penetrating through the side member;
   a gear locker installed in the side member and controlled by a controller;
   a bracket locker installed at the other ends of the moving bracket and the gear shaft so as to connect the moving bracket and the gear shaft to each other; and
   a bracket operator installed to be fixed to the side member and be connected to the moving bracket.

2. The impact absorbing apparatus of a vehicle of claim 1, further comprising a gear spring installed so that one end thereof is coupled to the side member and the other end thereof is coupled to the gear shaft in a state in which the gear spring is wound around the gear shaft to provide rotational force to the gear shaft so that the gear shaft is shaft-rotated at the time of unlocking the rotating gear.

3. The impact absorbing apparatus of a vehicle of claim 1, wherein the moving bracket is provided with a guide hole having both ends thereof extended along a front and rear direction of the moving bracket, and
   the other end of the gear shaft is installed to be inserted into the guide hole.

4. The impact absorbing apparatus of a vehicle of claim 3, wherein the gear locker includes:
   a housing installed in the side member;
   a locking lever installed in the housing so as to be rotatable through a hinge shaft and having an engagement protrusion formed integrally with one end thereof, the engagement protrusion being engaged with the rotating gear;
   a lever spring installed so that one end thereof is supported by the other end of the locking lever and the other end thereof is supported by the housing to provide elastic force to the locking lever so that the engagement protrusion is engaged with the rotating gear; and
   an actuator installed to be fixed to the housing so as to face the lever spring, having the locking lever therebetween, including a plunger pushing, and rotating the locking lever so that the engagement protrusion is disengaged from the rotating gear according to a control of the controller.

5. The impact absorbing apparatus of a vehicle of claim 4, wherein the bracket locker includes:
   a line shaped locking block coupled integrally with the other end of the gear shaft; and
   an upper guide protrusion and a lower guide protrusion positioned at upper and lower sides, respectively, having the guide hole therebetween, protruded from one side surface of the moving bracket toward the rotating gear, formed to contact the locking block when the locking block is in a standing state, thereby limiting a movement of the moving bracket, and formed to avoid a contact with the locking block when the locking block is in a horizontally laid state, thereby allowing the movement of the moving bracket.

6. The impact absorbing apparatus of a vehicle of claim 1, wherein the bracket operator includes:
   a fixed bracket installed to be fixed to an inner portion of the side member at a position spaced apart from the moving bracket toward a rear thereof; and
   a bracket spring having both ends thereof installed to be fixed to the moving bracket and the fixed bracket and providing elastic force to the moving bracket so that the moving bracket is moved toward the fixed bracket.

7. The impact absorbing apparatus of a vehicle of claim 1, wherein the bracket operator includes:
   a cylinder member having one end fixed to a front end portion of the side member and the other end installed toward the rear of the side member and having gunpowder filled in an internal space thereof, the gunpowder generating pressure at the time of being exploded; and
   a piston rod member having one end thereof inserted into the cylinder member so as to be movable along the cylinder member and the other end thereof protruded from the cylinder member and coupled to the moving bracket so as to forcibly move the moving bracket rearward while being protruded from the cylinder member by the pressure generated at the time of exploding the gunpowder.

8. The impact absorbing apparatus of a vehicle of claim 5, wherein a plurality of rotating gears, a plurality of gear shafts, and a plurality of locking blocks are configured to be disposed in a row along the front and rear direction of the moving bracket,
   the rotating gears are installed to be engaged with each other, and
   only any one of the rotating gears is installed to be engaged with the engagement protrusion of the locking lever.

* * * * *